United States Patent [19]

Aishima et al.

[11] 3,969,313

[45] July 13, 1976

[54] THERMOPLASTIC COMPOSITE COMPOSITIONS

[75] Inventors: Itsuho Aishima; Yukichi Takashi; Yoshihiko Katayama; Kenji Arimoto; Koichi Matsumoto, all of Kurashiki, Japan

[73] Assignee: Asahi Kasei Kogyo Kabushiki Kaisha, Osaka, Japan

[22] Filed: June 5, 1973

[21] Appl. No.: 367,311

[30] Foreign Application Priority Data

June 14, 1972 Japan.............................. 47-58563
May 2, 1973 Japan.............................. 48-48464

[52] U.S. Cl............................. 260/40 R; 260/37 R; 260/37 N; 260/37 AL; 260/37 PC; 260/42.14
[51] Int. Cl.² ...................... C08K 9/04; C08K 9/10
[58] Field of Search....................... 260/41, 42.14, 40

[56] References Cited

UNITED STATES PATENTS

| | | | |
|---|---|---|---|
| 3,304,197 | 2/1967 | Pundsack | 260/42.14 |
| 3,375,219 | 3/1968 | Robb | 260/41 |
| 3,471,439 | 10/1969 | Bixler et al. | 260/41 |
| 3,654,219 | 4/1972 | Boyer | 260/41.5 |
| 3,694,403 | 9/1972 | Aishima et al. | 260/41 |

Primary Examiner—James H. Derrington
Attorney, Agent, or Firm—Burgess, Dinklage & Sprung

[57] ABSTRACT

A thermoplastic composite composition comprising

I. about 95 to about 30 percent by weight of a thermoplastic material and
II. about 5 to about 70 percent by weight of a polyolefin composition comprising
  A. about 15 to about 60 percent by weight of a polyolefin and
  B. about 85 to about 40 percent by weight of at least one reactive inorganic filler,
  said reactive inorganic filler having been prepared by effecting reaction between
    a. an inorganic material substantially comprising at least one compound selected from the group consisting of metal carbonates, metal hydroxides and metal oxides, said metal being selected from the group consisting of beryllium, magnesium, calcium, strontium, barium, zinc, cadmium and aluminum, said compound having a number average particle diameter of from about 0.01 $\mu$. to about 50 $\mu$. and a maximum particle diameter of about 100 $\mu$., and
    b. at least one unsaturated aliphatic or aromatic carboxylic acid having from 3 to 11 carbon atoms, one or two ethylenic unsaturations, one or two carboxyl groups, the proportion of said unsaturated aliphatic or aromatic carboxylic acid being from about 0.05 to 20 percent by weight of the total weight of said inorganic material, with stirring in the absence of liquid-form water in the powder state of said inorganic material at a temperature up to the temperature at which said aliphatic or aromatic carboxylic acid begins to decompose.

17 Claims, No Drawings

THERMOPLASTIC COMPOSITE COMPOSITIONS

BACKGROUND OF THE INVENTION

This invention relates to a thermoplastic composite composition comprising (I) a thermoplastic material and (II) a polyolefin composition containing specific reactive inorganic filler at a high concentration.

Polymer blending is a known method for improving the properties of plastics, and polyolefins are polymers useful for polymer blending. In general, when two or more polymers are mixed to produce a polymer blend the melting point of the resulting polymer blend decreases in accordance with Flory's equation, and as for other physical properties the polymer blend usually exhibits the defects of the polymers mixed. Therefore, only few polymer blends are suited for practical uses. Even if a polymer blend is successfully obtained, the amount of a polymer to be incorporated therein is generally small and the optimum mixing ratio from the point of view of coupling the maximum improvement in the properties in the resulting polymer blend with the minimum sacrifice in the properties is in a narrow range. This tendency is remarkably observed on the polymer blends of crystalline polymers or polar polymers with polyolefins. Factors such as low compatibility between the polymers mixed, non-ununiformity of the dispersion due to the difference in melting viscosity of the polymers mixed, non-uniformity of cooled and solidified state and great residual stress due to the difference in melting point, coefficient of thermal contraction, coefficient of linear expansion and specific heat of the polymers mixed, and non-uniformity of stress distribution due to the difference in rigidity of the polymers mixed are considered to disadvantageously influence on the moldability, external apperance of molded articles and properties, especially mechanical strength of polymer blends.

Methods of overcoming these disadvantages are already available. British Patent Nos. 998,439 and 1,194,453 relate to the polymer blending of a polar polymer with a non-polar polymer, and in order to improve the compatibility of the polymers to be mixed the non-polar polymer is copolymerized with a polar monomer. Japanese Patent Publication No. 41456/1971 decribes the control of the liquid state of polymer blends by extremely varying melting viscosities of the polymers mixed. According to these methods, however, mechanical strength, rigidity, thermal resistance and creep greatly deteriorate. This suggests that by the improvement in compatibility alone or in liquid state alone full and sufficient effects of polymer blending cannot be obtained and there are some other factors which influence on polymer blends. In now pending application Ser. No. 316,314, filed Dec. 18, 1972 by the present applicants plus others there are disclosed thermoplastic compositions comprising about 15 to 90 percent by weight of a thermoplastic material and about 85 to 10 percent by weight of at least one reactive inorganic filler, said reactive inorganic filler having been prepared by effecting reaction between an inorganic material and an unsaturated aliphatic or aromatic carboxylic acid with stirring in the absence of liquid-form water in the powder state.

THE INVENTION

In accordance with this invention, there are provided thermoplastic composite compositions comprising I. about 95 to about 30 percent by weight of a thermoplastic material and
II. about 5 to about 70 percent by weight of a polyolefin composition comprising
   A. about 15 to about 60 percent by weight of a polyolefin and
   B. about 85 to about 40 percent by weight of at least one reactive inorganic filler,
   said reactive inorganic filler having been prepared by effecting reaction between
   a. the inorganic material substantially comprising at least one compound selected from the group consisting of metal carbonates, metal hydroxides and metal oxides, said metal being selected from the group consisting of beryllium, magnesium, calcium, strontium, barium, zinc, cadmium and aluminum, said compound having a number average particle diameter of from about 0.01 $\mu$ to about 50 $\mu$ and a maximum particle diameter of about 100 $\mu$, and
   b. at least one unsaturated aliphatic or aromatic carboxylic acid having from 3 to 11 carbon atoms, one or two ethylenic unsaturations, one or two carboxyl groups, the proportion of said unsaturated aliphatic or aromatic carboxylic acid being from about 0.05 to 20 percent by weight of the total weight of said inorganic material,
   with stirring in the absence of liquid-form water in the powder state of said inorganic material at a temperature up to the temperature at which said aliphatic or aromatic carboxylic acid begins to decompose.

According to this invention the compatibility of a polyolefin with a variety of thermoplastic materials is improved and the dispersion of the polyolefin into the thermoplastic materials is good and there is no phase separation in molded articles of the thermoplastic composite composition. Consequently, the surface state of the molded articles obtained is excellent. The thermoplastic composite compositions of this invention are characterized by remarkable improvements in properties required for the uses of the thermoplastic materials such as abrasion resistance, gas impermeability, oil resistance, moldability, rigidity, weatherability, environmental stress cracking resistance and impact resistance without reducing the mechanical strength, creep and thermal resistance possessed by the thermoplastic materials.

Suitable examples of such unsaturated aliphatic or aromatic carboxylic acids having from 3 to 11 carbon atoms, one or two ethylenic unsaturations, and one or two carboxylic groups which may be employed in the preparation of the reactive inorganic fillers include acrylic acid, methacrylic acid, alpha-ethylacrylic acid, alpha-chloroacrylic acid, alpha-bromoacrylic acid, alpha-fluoroacrylic acid, N-carbomethyl-alpha-aminoacrylic acid, atropic acid, angelic acid, crotonic acid, beta-aminocrotonic acid, alpha-ethylcrotonic acid, cinnamic acid, o-, m-, or p-carboxycinnamic acid, o-, m-, or p-aminocinnamic acid and o-, m-, or p-hydroxycinnamic acid, butadiene-1-carboxylic acid, sorbic acid, styrylacrylic acid, muconic acid, beta-2-furylacrylic acid, vinylacetic acid, allylacetic acid, styrylacetic acid, allylmalonic acid, vinylglycolic acid, piroterebic acid, itaconic acid, maleic acid, fumaric acid, citraconic acid, aconitic acid, isopropylidene succinic acid, endobicyclo (2,2,1)-5-heptene-2,3-dicarboxylic acid. Two or more such compounds may be used in combination. As for the water content of these unsaturated carboxylic acids, the smaller the better and practically it is preferred that the water content is at most about 5 percent by weight.

Suitable examples of the inorganic materials substantially comprising such metal carbonates, metal oxides and metal hydroxides include calcium carbonate, precipitated calcium carbonate, natural magnesite [$M_nCO_3$], natural hydromagnetite [$3M_nCO_3 \cdot M_n(OH)_3 \cdot 3H_2O$ or $4M_nCO_3 \cdot M_n(OH)_3 \cdot 4H_2O$], and synthetic basic magnesium carbonate [$3MgCO_3 \cdot Mg(OH)_2 \cdot 3H_2O \cdot 4MgCO_3 \cdot Mg(OH)_2 \cdot 4H_2O$], calcium magnesium carbonate, beryllium carbonate, beryllium oxycarbonate [$(BeO)_x (BeCO_3)_y$], strontium carbonate, zinc carbonate, cadmium carbonate, beryllium oxide, magnesium oxide, calcium oxide, strontium oxide, barium oxide, zinc oxide, cadmium oxide, aluminum oxide, aluminum oxide monohydrate [$Al_2O_3 \cdot H_2O$], aluminum oxide dihydrate [$Al_2O_3 \cdot 2H_2O$], aluminum oxide trihydrate [$Al_2O_3 \cdot 3H_2O$]; and beryllium hydroxide, magnesium hydroxide, calcium hydroxide, strontium hydroxide, berium hydroxide, zinc hydroxide, cadmium hydroxide and aluminum hydroxide. Two or more such compounds may be used in combination.

The number average particle size of the metal carbonates, metal oxides and metal hydroxides used in this invention is from about 0.01 $\mu$. to about 50 $\mu$., preferably from about 0.1 $\mu$. to about 10 $\mu$., and the maximum particle diameter is about 100 $\mu$., and preferably about 50 $\mu$. With regard to the water content, the smaller the better and practically it is preferred that the water content is at most about 2 percent.

The proportion of the unsaturated aliphatic or aromatic carboxylic acids is about 0.05 to about 20 percent by weight, preferably about 0.10 to 20 percent by weight, of the total weight of the metal carbonates, metal oxides ormetal hydroxides. However, this proportion varies depending upon the number average particle diameter of such metal compounds. That is, when the number average particle diameter is from about 0.01 $\mu$. to about 0.10 $\mu$., the proportion of the unsaturated aliphatic or aromatic carboxylic acids is from about 0.5 to about 20.0 percent by weight, preferably 1.0 to 10.0 percent by weight of the total weight of the metal compounds, and when the number average particle diameter is from about 0.1 $\mu$. to about 10.0 $\mu$., the proportion is from about 0.1 to about 10.0 percent by weight, preferably from about 0.5 to about 5.0 percent by weight, of the total weight of the metal compounds. When the number average particle diameter is from about 10 $\mu$. to about 50 $\mu$., the proportion is from about 0.05 to about 5.00 percent by weight, preferably from about 0.1 to about 2.0 percent by weight, of the total weight of the metal compounds.

When the proportion of the unsaturated aliphatic or aromatic carboxylic acid is more than about 20 percent weight, the processability of the polyolefin compositions is remarkably reduced and surfaces of shaped structures obtained from the thermoplastic composite compositions are discolored due to foaming. On the other hand, proportions of less than about 0.05 percent by weight do not form an effective layer on inorganic materials and the mechanical properties of the thermoplastic composite compositions are not satisfactorily improved.

The reactive inorganic fillers of this invention are produced by effecting reaction between the inorganic material substantially comprising the metal carbonates, metal oxides or metal hydroxides and the unsaturated aliphatic or aromatic carboxylic acids in the absence of liquid-form water in the powder state of said inorganic material at a temperature up to the temperature at which the unsaturated aliphatic or aromatic carboxylic acids begin to decompose, typically from about 10°C., preferably from about 50°C. to about 200°C., more preferably from about 80°C. to about 150°C. with stirring.

It is essential that this reaction is carried out in the absence of water in the form of liquid by mixing the inorganic materials in the powder state and the unsaturated aliphatic or aromatic carboxylic acids with stirring. The evolved water and the evolved carbon dioxide in the case where the inorganic materials are the metal carbonates, are removed from the reaction system. In preparing the reactive inorganic fillers of this invention the presence of water in the form of liquid prevents formation of an effective layer of the reaction products, on the surface of the inorganic material, between the inorganic materials and the unsaturated aliphatic or aromatic carboxylic acids, because the effective layer is mostly separated by the water from the reactive inorganic fillers produced.

The reactive inorganic fillers thus obtained have an effective layer of reaction products, on the surface of the inorganic materials, between the inorganic materials and the unsaturated aliphatic or aromatic carboxylic acids of from about 5 A to 150 A, preferably from 10 A to 100 A, calculated by the BET specific surface area measuring method. It might be considered that the carboxylate ion of the unsaturated aliphatic or aromatic acids forms an ionic bond with the metal ion on the crystal surface of the inorganic materials.

The reaction may be carried out in the presence or absence of an organic solvent which does not ionize the metal carbonates, hydroxides and oxides, the unsaturated aliphatic or aromatic carboxylic acids and the reaction products formed by reaction between the metal carbonates, hydroxides, oxides and the unsaturated aliphatic or aromatic carboxylic acids, but dissolves the acids.

Such solvents include, for example, benzene, toluene, xylene, hexane, cyclohexane, heptane, decane, decalin, tetralin, carbon tetrachloride, chloroform, ethylene chlorides, ethyl ether, propyl ethers, butyl ethers, acetone, methylethyl ketone, ethyl acetate and butyl acetates.

The reaction pressure is not critical. It may be carried out at atmospheric pressure, and may also be carried out under reduced pressures or under pressures up to about 10 Kg./cm². The reaction time varies depending upon the other conditions and, in general, from about 1 minute to about 2 hours, preferably from about 10 minutes to about 40 minutes.

As an apparatus for the reaction, any conventional mixing apparatus and any conventional autoclaves may be utilized and high-speed agitators such as Henschel mixer are preferred.

The polyolefins which may be employed in the preparation of the polyolefin compositions include high density polyethylene, low density polyethylene, crystalline polypropylene, crystalline polybutene, poly-3-methyl-butene-1, poly-4-pentene-1 and copolymers comprising more than about 80 percent by weight of ethylene or propylene and less than 20 percent by weight of a comonomer selected from ethylene, propylene, butene-1, pentene-1, hexene-1, 3-methyl butene-1, and 4-methyl pentene-1 and mixtures thereof.

According to this invention the polyolefin compositions comprise from about 15 to about 60 percent by weight of polyolefins and from about 85 to about 40 percent by weight of reactive inorganic fillers, and preferably from about 25 to about 50 percent by weight of polyolefins and from about 75 to about 50 percent by weight of reactive inorganic fillers. When the amount of the reactive inorganic filler is more than 85 percent by weight, the second order flocculation of the reactive inorganic filler occurs in the course of melt-mixing and accordingly, it is difficult to obtain substantially uniform polyolefin compositions. On the other hand, amounts of reactive inorganic filler of less than 40 percent by weight do not significantly exhibit the effects of incorporating the reactive inorganic filler with the polyolefin.

When the polyolefin and the reactive inorganic filler are reacted in a melt with mixing, it is not essential but preferable that conventional radical generators are incorporated therein in order to promote the reaction between the polyolefin polymer radical and the reaction products obtained from the unsaturated aliphatic or aromatic carboxylic acid and the inorganic filler on its surface.

Exemplary radical generators include tetravalent organotin compounds such as dibutyltin oxide; organic peroxides such as 2,5-dimethyl-2,5-di(t-butylperoxy)-hexene, 2,5-dimethyl-2,5-di(t-butylperoxy)hexyne-3, dicumyl peroxide, t-butylperoxy maleic acid, lauroyl peroxide, benzoyl peroxide, t-butyl perbenzoate, t-butyl hydroperoxide, isopropyl percarbonate; azo compounds such as azobisisobutyronitrile, and inorganic peroxides such as ammonium persulfate. These radical generators may be used alone or in a mixture.

The amount of radical generators may vary depending upon such factors as the polyolefin, unsaturated aliphatic or aromatic carboxylic acid selected, the conditions of melt-mixing. The radical generators are generally used in an amount of up to about one mole percent of the unsaturated aliphatic or aromatic carboxylic acid.

In order to produce the polyolefin compositions of this invention, the polyolefin and the reactive inorganic filler are reacted in a melt with mixing. The melt-mixing temperature may vary within wide limits depending upon such factors as the polyolefin and the unsaturated aliphatic or aromatic carboxylic acid selected, the presence or absence of the radical generator, the mixing apparatus chosen. Typically the melt-mixing temperature is in the range of from about 140°C. to about 350°C., and the preferred range is from about 170°C. to about 280°C.

For the purpose of uniformly melt-mixing the polyolefin and the reactive inorganic filler, screw extruders, Banbury mixers, mixing rolls, kneaders, Henschel mixers or other conventional mixing apparatus may be conveniently employed.

The thermoplastic composite compositions of this invention are produced by melt-mixing the polyolefin compositions and various thermoplastic materials.

The thermoplastic materials which may be employed in the practice of this invention include polyamides having a weight average molecular weight of from about 10,000 to about 50,000, and preferably from about 20,000 to about 40,000 such as polycaprolactam, polyhexamethylene adipamide, polyhexamethylene sebacamide, poly-omega-aminoundecanoic acid, poly-omega-laurolactam and mixtures thereof; polyacetals having a weight average molecular weight of from about 20,000 to about 200,000 and preferably from about 40,000 to about 100,000 such as polyoxymethylene homopolymers and copolymers of polyoxymethylenes containing from about 80 percent to 95 percent recurring units of oxymethylene, typically terminated with acyl or isocyanato groups and mixtures thereof; polyesters having a weight average molecular weight of from about 10,000 to about 50,000 and preferably from about 20,000 to about 40,000 such as polyethylene terephthalate, polybutylene terephthalate, poly-p-ethylene oxybenzoate, polyethylene-1,2-diphenoxyethane-4,4'-dicarboxylate and copolyesters such as polyethylene terephthalate-isophthalate, polyethylene terephthalate-5-sodium sulfoisophthalate and mixtures thereof; polyvinyl chlorides having a weight average molecular weight of from about 30,000 to about 200,000 and preferably from about 50,000 to about 100,000 such as polyvinyl chloride, polyvinylidene chloride, copolymers thereof, post-chlorinated polyvinyl chlorides, mixtures of polyvinyl chlorides with chlorinated polyethylenes or acrylonitrile butadiene-styrene copolymers; polyphenylene oxides having a weight average molecular weight of more than about 12,000, and preferably from about 20,000 to about 30,000 such as poly-(2,6-dimethylphenylene-1,4-ether), poly-(2,6-diethylphenylene-1,4-ether) and mixtures thereof with polstyrenes; polycarbonates having a weight average molecular weight of from about 10,000 to about 50,000, and preferably from about 20,000 to about 40,000 such as aromatic polycarbonates having been prepared by the reaction between a dihydric phenol such as 2,2-bis-(4-hydroxyphenyl)-propane, hydroquinone, 2,2-bis-(4-hydroxyphenyl)-pentane and a carbonate precursor such as phosgene, bischloroformates of dioxy compounds, diesters of carbonic acid; and polystyrenes having a weight average molecular weight of from about 50,000 to about 500,000, and preferably from about 100,000 to about 300,000 such as styrene homopolymers, rubber modified polystyrenes, copolymers of styrene and acrylonitrile, copolymers of styrene with butadiene and acrylonitrile and mixtures thereof.

The thermoplastic composite compositions of this invention comprise from about 5 to about 70 percent by weight of the polyolefin composition and from about 95 to about 30 percent by weight of the thermoplastic material. They preferably comprise from about 10 to about 50 percent by weight of the polyolefin composition and from about 90 to about 50 percent by weight of the thermoplastic material. When the amount of the polyolefin composition is outside of the above-described range, it is impossible to produce the excellent effects of this invention.

In order to impart to the thermoplastic composite composition excellent mechanical and thermal properties, moldability and resistances to abrasion, weathering and heat with a good balance, the state of the polyolefin composition relative to the thermoplastic material becomes important. Namely, the preferred state is that the polyolefin composition as the discontinuous phase (particles), is dispersed in the thermoplastic material as the continuous phase (matrix). The state is independent of the mixing ratio of the thermoplastic material to the polyolefin composition, and may be controlled by such factors as the melting viscosities of the polyolefin composition and the thermoplastic material, the mixing machine employed, the extent of mixing, the molding method selected, the condition of crystallization and other factors. The state is to be suitably chosen depending on the object of the resulting thermoplastic composite compsoition.

To produce the thermoplastic composite compositioons of this invention, the polyolefin composition and the thermoplastic material are typically mixed at a temperature of from the melting points or the softening points of both the polyolefin composition and the thermoplastic material to the decomposition temperatures of both using any mixing machine such as a monoscrew extruder, twin-screw extruder, Banbury mixer, kneader, mixing rollers. Alternatively, the pellets or powders of the polyolefin composition and the thermoplastic material may be dry-blended, and then directly fed to an apparatus equipped with a screw impeller such as an injection-molder, sheet-molder, flow-molder or film-molder to give a variety of molded articles.

The thermoplastic composite compositioons of this invention may additionally contain such stabilizers, plasticizers, lubricant, crosslinking agents, fibrous reinforcing agents, pigments, dyestuffs, nucleating agents, antistatic agents, flame retardants, foaming agents or other additives as do not detract from their desirable characteristics.

The thermoplastic composite compositions of the present invention have a wide range of uses such as making molded articles by compression-molding, extrusion-molding, blow-molding, injection-molding, thermoforming, rotational-molding, calendering, foam-processing, stretching or casting.

The thermoplastic composite compositions of this invention have a dispersed state where the thermoplastic material is a continuous phase and the polyolefin composition is a discontinuous phase. According to this invention, the polyolefin composition may be incorporated with a thermoplastic material at a higher concentration than a polyolefin, and the dispersion of the polyolefin composition is much more unifrm than that of a polyolefin. Accordingly, there is no stratified patterns on the surface of the molded articles obtained from the thermoplastic composite composition due to phase separation. As the inorganic filler is firmly and chemically bonded to a polyolefin in the polyolefin composition, the inorganic filler does not migrate to the phase of a thermoplastic material in the course of melt-mixing of the polyolefin composition with the thermoplastic material. Therefore, the thermoplastic composite composition has uniformity and an excellent thermal stability. By selecting a polyolefin composition having a higher modulus of elasticity than a thermoplastic material there may be obtained a thermoplastic composite composition having a higher modulus of elasticity than thermoplastic material. In general, the thermoplastic composite composition comprising the polyolefin composition has a much better balance of mechanical strength, rigidity and theremal resistance than that comprising a polyolefin. The thermoplastic composite compositions comprising the polyolefin composition and a polyamide, polyacetal or polyester have remarkably improved oil resistance, abrasion resistance and gas impermeability, and furthermore can be blow-molded. When the polyolefin composition is incorporated with a polycarbonate, the moldability of the resulting composite composition is widely improved without losing the desirable properties of the polycarbonate. Also when the polyolefin composition is incorporated with a polyphenylene oxide, the resistance to an aggressive solvent is improved to a great extent without significant loss of the desirable properties of the phenylene oxide. The thermoplastic composite compositions comprising the polyolefin composition and a non-crystalline high polymer for molding such as a polystyrene or a polyvinyl chloride are improved in impact resistance without loss of the desirable properties of the non-crystalline high polymer.

The following examples will serve to illustrate this invention more fully and practically. Parts in the examples are all by weight unless expressly stated to the contrary.

EXAMPLE 1, RUN NOS. 1 TO 3

The reaction between 10 Kg. of precipitated calcium carbonate having a number average particle diameter of 1.4$\mu$., a maximum particle diameter of 10$\mu$. and a BET specific surface area of 6 m$^2$./g. and 400g. of acrylic acid was effected by stirring at 90°C. for 30 minutes using a 75 liter high-speed agitator at a rotation rate of 860 r.p.m. while introducing therein dry air of 90°C., to give reactive calcium carbonate filler. During the reaction the envolved steam and carbon dioxide were removed in the gaseous form from the agitator. The resulting reactive calcium carbonate was non-pasty dry powder free from the odor of acrylic acid.

30 parts of high density polyethylene having a density of 0.97 and a melt index of 5.0 annd 70 parts of the reactive calcium carbonate in the proportion set forth in Table 1 together with 0.1 part of 2,5-dimethyl-2,5-di(t-butylperoxy) hexane were well melt-mixed using a 1.8 liter Banbury mixer at a rotating rate of 100 r.p.m. and at floating rate of 4.0 Kg./cm. for 3 minutes at a temperature of the polyethylene of 230°C. and then the resulting mixture was formed into a sheet with a pair of mixing rollers having a diameter of 8 inches and pelletized. The pellets of the polyethylene composition and those of polyhexamethylene adipamide having a weight average molecular weight of about 20,000 were dry-blended at a rate set forth in Table 1 and fed to an injection molder of 50 oz. screw-in-line type and at a resin temperature of 280°C there were obtained test pieces of the composite compositiions. Various properties of the resulting test pieces were measured and the results are shown in Table 1.

EXAMPLE 1, RUN NO. 4

50 parts of the same polyethylene composition as in Example 1, Run No. 1 and 50 parts of the same polyhexamethylene adipamide as in Example 1, Run No. 1 were dry-blended, fed to a twin screw extruder, well melt-mixed at a resin temperature of 280°C., extruded therefrom and pelletized. From the resulting composite composition there were obtained test pieces by injection-molding in the same manner as in Example 1, Run No. 1. Various properties of the test pieces are shown in Table 1.

Reference 1-1

70 parts of the same precipitated calcium carbonate as in Example 1 and 30 parts of the same high density polyethylene as in Example 1 were well melt-mixed using a high-speed agitator in the same manner as in Example 1 to produce a polyethylene composition. 50 parts of the resulting polyethylene composition and 50 parts of the same polyhexamethylene adipamide as in Example 1 were dry-blended and then in the same manner as in Example 1 there were obtained test pieces which were discolored yellow. Various properties of the test pieces are shown in Table 1.

Reference 1-2

50 parts of the same high density polyethylene as in Example 1 and 50 parts of the same polyhexamethylene adipamide as in Example 1 were dry-blended and then in the same manner as in Example 1 there were obtained test pieces. On the surface of the test pieces there appeared stripe-patterns. Various properties of the test pieces are shown in Table 1.

Reference 1-3

From the same polyhexamethylene adipamide in Example 1 there were obtained test pieces in the same manner as in Example 1. Various properties of the test pieces are shown in Table 1.

Reference 1-4

The same polyethylene composition as in Example 1 was injection-molded at a resin temperature of 250°C. to produce test pieces in the same manner as in Example 1. Various properties of the test pieces are shown in Table 1.

Reference 1-5

The same high density polyethylene as in Example 1 was injection-molded at a resin temperature of 230°C. to produce test pieces in the same manner as in Example 1. Various properties of the test pieces are shown in Table 1.

Reference 1-6

35 parts of the same reactive inorganic filler as in Example 1 and 50 parts of the same polyhexamethylene adipamide as in Example 1 were pre-mixed, fed to a twin screw mixing machine, extruded therefrom at a resin temperature of 280°C. and pelletized. 85 parts of the resulting pellets and 15 parts of pellets of the same high density polyethylene as in Example 1 were dry-blended and injection-molded in the same manner as in Example 1 to produce test pieces. On the surface of the test pieces there appeared stripe-patterns due to phase separation. The properties of the test pieces are shown in Table 1.

Reference 1-7

50 parts of the same polyhexamethylene adipamide as in Example 1 and 15 parts of the same high density polyethylene as in Example 1 were dry-blended, fed to the same twin screw-mixing machine as in Reference 1-6, extruded therefrom at a resin temperature of 280°C. and pelletized. 65 parts of the resulting pellets and 35 parts of the same reactive inorganic filler as in Example 1 were pre-mixed, fed to the same mixing machine as described above, extruded at a resin temperature of 280°C. and pelletized. The resulting pellets were injecting-molded in the same manner as in Example 1 to produce test pieces. On the surface of the test pieces there appeared stripe-patterns due to phase separation. The properties of the test pieces are shown in Table 1.

EXAMPLE 2

50 parts of the same reactive inorganic filler as in Example 1, 50 parts of the high density polyethylene as in Example 1 and 0.01 part of the same radical generator as in Example 1 were well melt-blended and pelletized in the same manner as in Example 1 to produce pellets of a polyethylene composition. Then the resulting polyethylene composition and the same polyhexamethylene adipamide as in Example 1 were dry-blended at a rate set forth in Table 2 and injection-molded in the same manner as in Example 1 to produce test pieces. Various properties of the test pieces are shown in Table 2.

EXAMPLE 3

Example 1, Run No. 2 was repeated except that in the preparation of reactive inorganic fillers a variety of inorganic fillers set forth in Table 3 were used instead of the precipitated calcium carbonate. The properties of the molded articles are shown in Table 3.

References 3-1 to 16

Example 1, Run No. 2 was repeated except that a variety of inorganic fillers set forth in Table 3 were used instead of the reactive precipitated calcium carbonate. The properties of the molded articles are shown in Table 3.

EXAMPLE 4

Example 1, Run No. 2 was repeated except that in the preparation of reactive inorganic fillers, 400g., based on 10 Kg. of the precipitated calcium carbonate, of a variety of unsaturated carboxylic acids set forth in Table 4 were used instead of the acrylic acid. The properties of the molded articles are shown in Table 4.

Reference 4-1 to 3

Example 1, Run No. 2 was repeated except that in the preparation of reactive inorganic fillers, 400g., based on 10 Kg. of the precipitated calcium carbonate, of a saturated aliphatic carboxylic acid, a higher saturated aliphatic carboxylic acid and a higher unsaturated aliphatic carboxylic acid were used instead of the acrylic acid. The properties of the molded articles are shown in Table 4.

EXAMPLE 5

Example 1, Run No. 2 was repeated except that in the preparation of the reactive precipitated calcium carbonate the amount of acrylic acid was varied. The properties of the molded articles are shown in Table 5.

EXAMPLE 6

The same polyethylene composition as in Example 1 and polyhexamethylene adipamide having a weight average molecular weight of about 20,000 and containing 33 percent by weight of silane-treated glass fiber having a diameter of 10 microns and an average length of 0.7mm. were dry-blended and injection-molded in the same manner as in Example 1 to produce molded articles. The properties of the molded articles are shown in Table 6.

EXAMPLE 7

50 parts of the same polyethylene composition as in Example 1 and 50 parts of polycaprolactam having a weight average molecular weight of about 20,000 were dry-blended and injection-molded at a resin temperature of 230°C. in the same manner as in Example 1 to produce molded articles. The properties of the molded articles are shown in Table 7.

Reference 7-1

50 parts of the same polyethylene composition as in Reference 1-1 and 50 parts of the same polycaprolactam as in Example 7 were dry-blended and injection-molded in the same manner as in Example 7 to produce molded articles. The properties of the molded articles are shown in Table 7.

Reference 7-2

50 parts of the same high density polyethylene as in Example 1 and 50 parts of the same polycaprolactam as in Example 7 were dry-blended and injection-molded in the same manner as in Example 7 to produce molded articles. The properties of the molded articles are shown in Table 7.

EXAMPLE 8

Example 1, Run No. 2 was repeated except that a variety of polyolefins set forth in Table 8 without the radical generator were used and the melt-mixing temperature of the polyolefins and reactive inorganic fillers was varied according to the polyolefins. The properties of the molded articles are shown in Table 8.

References 8-1 to 3

Reference 1, Run No. 2 was repeated except that a variety of polyolefins were used instead of the high density polyethylene. The properties of the molded articles are shown in Table 8.

EXAMPLE 9

The reaction between 10 Kg. of ground calcium carbonate having a number average particle diameter of 1.2$\mu$., a maximum particle diameter of 10$\mu$. and a BET specific surface of 3 m$^2$./g. and 100 g. of acrylic acid was effected by stirring at 110°C. for 20 minutes using a high-speed agitator while introducing therein dry air of 100°C., to produce reactive calcium carbonate filler. During the reaction the envolved steam and carbon dioxide were removed in the gaseous form from the agitator. The resulting reactive calcium carbonate was non-pasty dry powder free from the odor of acrylic acid.

70 parts of the reactive calcium carbonate, 30 parts of high density polyethylene having a density of 0.96 and a melt-index of 14.0 and 0.01 part of 2,5-dimethyl-2,5-di(t-butylperoxy) hexane was well melt-mixed using a Banbury mixer for 2 minutes at a resin temperature of 210°C. and then the resulting mixture was formed into a sheet with a pair of mixing rolls and pelletized to give a polyethylene composition (I).

Also 50 paarts of the above-described reactive calcium carbonate, 50 parts of the above-described high density polyethylene and 0.01 part of the above-described radical generator were well melt-mixed, formed into a sheet and pelletized in the same manner as described above to give a polyethylene composition (II).

Pellets of the polyethylene composition (I) or (II) and those of polyoxymethylene homopolymer having a melt inde of 13.0, and a $K_{222}$ of 0.05% were dry-blended at a rate set forth in Table 9 and fed to an injection molder of 50 oz. screw-in line type and at a resin temperature of 200°C. and at a mold temperature of 80°C. there were obtained test pieces of the composite compositions. Various properties of the test pieces are shown in Table 8. As in clear from Table 9 the composite composition according to this invention exhibited very high abrasion resistance without reducing the mechanical properties and thermal resistance of polyoxymethylene.

Reference 9-1

Example 9 was repeated without using the polyethylene composition (I) or (II). the properties of the molded articles are shown in Table 9.

References 9-2 to 4

Example 9 was repeated except that alone the same high density polyethylene as in Example 9 was used instead of the polyethylene composition (I) or (II). The properties of the molded articles are shown in Table 9. On the surface of the molded articles there appeared silver radiate patterns.

EXAMPLE 10

Example 9, Run No. 2 was repeated except that in the preparation of reactive inorganic fillers a variety of inorganic fillers set forth in Table 10 were used instead of the ground calcium carbonate. The properties of this molded articles are shown in Table 10.

References 10-1 to 4

Example 9, Run No. 2 was repeated except that a variety of inorganic fillers set forth in Table 10 were used instead of the reactive ground calcium carbonate. The properties of the molded articles are shown in Table 10. The molded articles were discolored to yellowish brown.

EXAMPLE 11

The same sample as in Example 9, Run No. 2 is a composite composition wherein the polyethylene composition, in which 21 parts of the reactive ground calcium carbonate is dispersed into 9 parts of the high density polyethylene, is dispersed, as an independent phase, into the matrix of 70 parts of the polyoxymethylene homopolymer. The properties of the sample are shown in Table 11.

Reference 11-1

9 parts of the same polyethylene as in Example d9 instead of the polyethylene composition and 70 parts of the same polyoxymethylene as in Example 9 were well melt-mixed using a Banbury mixer for 2 minutes at a resin temperature of 190°C., and then to this melt mixture there were added 21 parts of the same reactive inorganic filler as in Example 9. The resulting mixture was well melt-mixed further for 2 minutes, formed into a sheet with a pair of rolls and pelletized. This sample is a composite composition in which the reactive inorganic filler is dispersed uniformly both into the phase of polyethylene and that of polyoxymethylene. The pellets of the composite composition thus obtained were injection-molded in the same manner as in Example 9 to produce test pieces, but in the course of injection-molding the thermal decomposition of the composite compositions vigorously occurred and the resulting test pieces were discolored to yellowish brown. The properties of the test pieces are shown in Table 11.

EXAMPLE 12

70 parts of the same reactive inorganic filler as in Example 9, 30 parts of high density polyethylene having a melt index of 0.2 and a density of 0.95 and 0.01 parts of 2,5-dimethyl-2,5-di(t-butylperoxy)hexane were well melt-mixed using a Banbury mixer and pelletized in the same manner as in Example 9 to produce pellets of the polyethylene composition. 30 parts of the resulting pellets of the polyethylene composition and 70 parts of the same polyoxymethylene as in Example 9 were dry-blended, well melt-mixed using an extruder and blow-molded at 200°C. to give bottles which had good external appearance, excellent resistance to chemicals and strength under presssure.

Reference 12

30 parts of the same high density polyethylene as in Example 12 instead of the polyethylene composition and 70 parts of the same polyoxymethylene as in Example 9 were dry-blended, well melt-mixed using an extruder and blow-molded at 200°C. but it was impossible to produce bottles due to vigorous phase separation of the composition.

EXAMPLE 13

70 parts of the same reactive inorganic filler as in Example 9 and 30 parts of crystalline polypropylene having a melt flow index of 7.8 and a density of 0.91 were well melt-mixed using a Banbury mixer in the same manner as in Example 9 to produce a polyropylene composition. The resulting polypropylene composition and the same polyoxymethylene as in Example 9 were dry-blended at a rate set forth in Table 12 and injection-molded at 200°C. in the same manner as in Example 9 to produce molded articles of the composite compositions. Various properties of the molded articles are shown in Table 12.

Reference 13-1

Example 13 was repeated without using the polypropylene composition. The properties of the molded articles are shown in Table 12.

Reference 13-2

Example 13 was repeated except that the same polypropylene alone as in Example 13 was used instead of the polypropylene composition. The properties of the molded articles are shown in Table 12.

EXAMPLE 14

The same polyethylene composition as in Example 9 and polethylene terephthalate having a softening point of 262.40C. and an intrinsic viscosity of 0.63 measured in a mixed solvent of phenol and tetrachloroethane at a volume ratio of 60 : 40 were dry-blended at a rate set forth in Table 12 and injection-molded at 270°C. in the same manner as in Example 1 to produce molded articles of the composite compositions. Various properties of the molded articles are shown in Table 13.

Reference 14-1

Example 14 was repeated without using the polyethylene composition. The properties of the molded articles are shown in Table 13.

Reference 14-2

Example 14 was repeated except that the same polyethylene alone as in Example 9 was used instead of the polyethylene composition. The properties of the molded articles are shown in Table 13.

EXAMPLE 15

The same polyethylene composition as in Example 9 and 2,2-bis-(4-hydroxyphenyl)-propane type polycarbonate having a weight average molecular weight of 30,000 were dry-blended at a rate set forth in Table 14 and injection-molded at 285°C. in the same manner as in Example 1 to produce test pieces of the composite compositions. Various properties of the molded articles are shown in Table 14. Althogh the molded articles were opaque, lowering of the properties was hardly observed and the rigidity was rather increased. Especially the presure of injection molding was remarkably reduced.

Reference 15-1

Example 15 was repeated without using the polyethylene composition. The properties of the molded articles are shown in Table 14.

Reference 15-2

Example 15 was repeated except that the same polyethylene alone as in Example 9 was used instead of the polyethylene composition. The properties of the molded articles are shown in Table 14.

EXAMPLE 16

The same polyethylene composition as in Example 9 and poly(2,6-dimethyl-1,4-phenylene) oxide having an intrinsic viscosity of 0.54 measured in chloroform at 30°C. were dry-blended at a rate set forth in Table 15, melt-mixed at 240°C. using a twin screw mixing machine and injection-molded at 310°C. in the same manner as in Example 1 to produce molded articles of the composite compositions. Various properties of the molded articles are shown in Table 15. The external appeaarance of the molded articles were good and lowering of the properties was hardly observed and the rigidity was rather increased. Especially the environmental stress cracking was remarkably improved.

Reference 16-1

Example 16 was repeated without using the polyethylene composition. The properties of the molded articles are shown in Table 15.

Reference 16-2

Example 16 was repeated except that the same polyethylene alone as in Example 9 was used instead of the polyethylene composition. The properties of the molded articles are shown in Table 15.

Example 17

| | Composition | Parts |
|---|---|---|
| (a) | The same polyethylene composition as in Example 9 | 0, 10, 30, 50 |
| (b) | Polyvinylchloride having an average degree of polymerization of 1050 (Trade mark "GEON 103FP" made by Japanese Geon Co.) | 100 |
| (c) | Tribasic lead sulfate | 4 |

Example 17-continued

| Composition | Parts |
|---|---|
| (d) Calcium stearate | 2 |

The above composition was melt-mixed at a resin temperature of 175°C. using a Banbury mixer and the resulting mixture was formed into a sheet with a pair of mixing rolls and pelletized. The pellets so obtained were compression-molded at 160°C. for 20 minutes under a pressure of 100 Kg./cm². to produce molded articles having a thickness of 3 mm. Various properties of the molded articles are shown in Table 16. As is clear from Table 16 the composite compositions are improved in impact resistance without significant loss in desirable properties.

Reference 17-1

Example 17 was repeated without using the polyethylene composition. The properties of the molded articles are shown in Table 16.

Reference 17-2

Example 17 was repeated except that the same polyethylene alone as in Example 9 was used instead of the polyethylene composition. The properties of the molded articles are shown in Table 16.

In the following tables which set out the results of the tests on the shaped structures of the foregoing examples, the properties were measured as follows:

Flexural strength — Unit: Kg./cm². ASTM D790
Flexural modulus — Unit: Kg./cm². ASTM D790
Izod impact strength (notched) — Unit: Kg.-cm./cm. ASTM D256
Heat distortion temperature — Unit: °C. ASTM D648
Tensile strength — Unit: Kg./cm². ASTM D638
Tensile elongation — Unit: % ASTM D638
Rate of water absorption — Unit: % (increase in weight) ASTM D570 63

A sample of 3mm. × 50mm. φ(diameter) is immersed in water at 23°C. for 24 hours.

$$\text{Increase in water } (\%) = \frac{\text{wet weight} - \text{conditioned weight}}{\text{conditioned weight}} \times 100$$

Oxygen permeability — Unit: ml . . mm./m². 24 hours.
Oxygen permeability is measured using a sample of 0.1mm. × 126mm. φ by Dr. Lyssy's gas permeability testing apparatus at 20°C. at a relative humidity of 65% under a pressure of one atm.

$$\text{Oxygen permeability} = \frac{CfT_1}{ApT_2}$$

C=concentration of oxygen in helium (p.p.m.)
f=flow rate of helium stream (ml./min.)
A=sample test area (m².)
p=partial pressure of oxygen gas (atm.)
$T_1$=273 (°K.)
$T_2$=temperature of measure (°K.)

Kinetic friction coefficient
The surface of sample of 25.6 mm.O.D. × 20.0 mm.I.D. × 17.0 mm.(long) is prepared by gentle abrasion on 500A grit silicon carbide paper. The measurement is carried out at an environmental temperature of 20°C. by a thrust bearing tester at a velocity of 30cm./sec. with a load of 10Kg./cm². using, as the mating material, S-45C. of which surface is prepared by gentle abrasion on 500A grit silicon carbide.

$$\mu k = \frac{F}{L}$$

F=friction force
L=load

PV limit — Unit: Kg./cm². × cm./sec.
The same sample, conditions and trust bearing tester as in the measurement of kinetic friction coefficient are used and the velocity is variable at 10 minute interval from 1cm./sec. to melt.

PV : P=load
V=limiting velocity; the limit may manifest itself in one or more of several forms (melting; cold-flow)

Weight loss — Unit: %
Decrease in weight after heating sample at 222° C. for 70 minutes in air Environmental stress cracking resistance — Unit: minute
Environmental stress cracking resistance is measured by bending a sample bar unit to 3% elongation on the upper surface of the strained sample bar and then this strained bar is locked in a four-point loading jig and immersed in hexane. The time necessary for the stained sample bar to crack on the strained surface is measured.

BET specific surface area — Unit: m²./g.
BET specific surface area is measured in accordance with the method by S. Brunaner, P.H. Emmett, E. Teller; Journal of American Chemical Society, Vol.60, p. 309(1938).

Table 1

| | Components of composition (parts) | | | | | Properties of composition | | | | |
|---|---|---|---|---|---|---|---|---|---|---|
| Run No. | Polyethylene | Inorganic filler | Polyhexamethylene adipamide | Flexural strength (Kg./cm².) | Flexural modulus (Kg./cm².) | Izod impact strength (Kg.-cm./cm. notched) | Heat distortion temperature (264 p.s.i. °C.) | Kinetic friction coefficient | Rate of water absorption (%) | Oxygen permeability (ml.mm./m²) |
| 1 | 20 | 47 | 33 | 720 | 37300 | 4.0 | 82 | 0.26 – 0.29 | 0.4 | 3 |
| 2 | 15 | 35 | 50 | 870 | 29800 | 5.4 | 77 | 0.28 – 0.32 | 0.6 | <1 |
| 3 | 10 | 23 | 67 | 840 | 27700 | 3.6 | 72 | 0.33 – 0.37 | 0.9 | <1 |
| 4 | 15 | 35 | 50 | 920 | 31200 | 6.8 | 79 | 0.27 – 0.29 | 0.5 | <1 |
| Reference | | | | | | | | | | |
| 1-1 | 15 | 35 | 50 | 540 | 30500 | 2.2 | 74 | 0.27 – 0.34 | 0.6 | <1 |
| 1-2* | 50 | — | 50 | 650 | 19500 | 7.0 | 65 | 0.34 – 0.38 | 0.9 | <1 |
| 1-3 | — | — | 100 | 1050 | 25600 | 2.4 | 72 | 0.40 – 0.45 | 1.4 | <1 |
| 1-4 | 30 | 70 | — | 900 | 78200 | 12.5 | 91 | 0.21 – 0.23 | 0.1 | 54 |
| 1-5 | 100 | — | — | 300 | 13900 | 11.0 | 45 | 0.15 – 0.24 | 0.1 | 38 |
| 1-6* | 15 | 35 | 50 | 920 | 32000 | 3.2 | 95 | 0.37 – 0.40 | 1.3 | <1 |
| 1-7* | 15 | 35 | 50 | 900 | 31000 | 3.8 | 45 | 0.41 – 0.42 | 1.2 | <1 |

Table 2

| Run No. | Components (parts) | | | Properties of composite composition | | | | | | |
|---|---|---|---|---|---|---|---|---|---|---|
| | Polyethylene | Inorganic filler | Polyhexamethylene adipamide | Flexural strength (Kg./cm².) | Flexural modulus (Kg./cm².) | Izod impact strength (Kg.-cm./cm. notched) | Heat distortion temperature (264 p.s.i., °C.) | Kinetic friction coefficient | Rate of water absorption (%) | Oxygen permeability (ml./mm/m²) |
| 1 | 33 | 33 | 34 | 680 | 32700 | 7.2 | 78 | 0.24 – 0.27 | 0.3 | 9 |
| 2 | 25 | 25 | 50 | 760 | 28600 | 7.6 | 76 | 0.26 – 0.28 | 0.4 | <1 |
| 3 | 17 | 17 | 63 | 780 | 27400 | 5.8 | 72 | 0.30 – 0.36 | 0.7 | <1 |

Table 3

| Run No. | Inorganic filler | | | | Acrylic acid per 100g. of inorganic filler (g.) | Properties of composite composition | | | |
|---|---|---|---|---|---|---|---|---|---|
| | Kind | Particle diameter Number average (μ.) | Particle diameter Maximum (μ.) | Specific surface area (m²./g.) | | Flexural strength (Kg./cm².) | Flexural modulus (Kg./cm².) | Izod impact strength (Kg.-cm./cm. notched) | Heat distortion temperature (264 p.s.i. °C.) |
| 1 | Ground calcium carbonate | 1.8 | 20 | 2.5 | 1.68 | 830 | 30000 | 4.9 | 77 |
| 2 | Basic magnesium carbonate | 0.4 | 1 | 6.3 | 4.22 | 860 | 32000 | 4.0 | 79 |
| 3 | Barium carbonate | 1.2 | 10 | 4.0 | 2.68 | 840 | 30000 | 4.2 | 76 |
| 4 | Strontium carbonate | 1.2 | 10 | 3.5 | 2.34 | 820 | 30000 | 4.0 | 76 |
| 5 | Magnesium hydroxide | 2.5 | 10 | 2.0 | 1.34 | 790 | 28000 | 4.1 | 73 |
| 6 | Aluminum hydroxide | 8.0 | 15 | 1.5 | 1.00 | 650 | 28000 | 5.2 | 72 |
| 7 | Calcium hydroxide | 1.0 | 5 | 4.0 | 2.68 | 790 | 30000 | 4.0 | 75 |
| 8 | Aluminum oxide monohydrate | 2.0 | 15 | 1.5 | 1.00 | 800 | 30000 | 4.0 | 74 |
| 9 | Magnesium oxide | 2.0 | 15 | 4.0 | 2.68 | 800 | 30000 | 4.8 | 74 |
| 10 | Calcium oxide | 2.0 | 30 | 3.6 | 2.42 | 720 | 29200 | 5.4 | 74 |
| 11 | Zinc oxide | 2.0 | 10 | 2.5 | 1.68 | 740 | 30000 | 4.2 | 74 |
| 12 | Beryllium oxide | 8.0 | 20 | 1.2 | 0.80 | 760 | 28000 | 4.9 | 72 |
| 13 | Aluminum oxide | 4.0 | 15 | 1.8 | 1.21 | 780 | 29000 | 4.0 | 72 |
| 14 | Strontium oxide | 1.0 | 10 | 2.5 | 1.68 | 800 | 31000 | 4.1 | 74 |
| 15 | Barium oxide | 3.0 | 20 | 1.2 | 0.80 | 780 | 29000 | 4.1 | 73 |
| 16 | Cadmium oxide | 1.5 | 15 | 2.5 | 1.68 | 720 | 30000 | 4.0 | 74 |
| Reference | | | | | | | | | |
| 3-1 | Ground calcium carbonate | 1.8 | 20 | 2.5 | — | 510 | 28000 | 2.0 | 75 |
| 3-2 | Basic magnesium carbonate | 0.4 | 1 | 6.3 | — | 490 | 31000 | 1.8 | 78 |
| 3-3 | Barium carbonate | 1.2 | 10 | 4.0 | — | 540 | 30000 | 3.1 | 77 |
| 3-4 | Strontium carbonate | 1.2 | 10 | 3.5 | — | 530 | 30000 | 2.9 | 76 |
| 3-5 | Magnesium hydroxide | 2.5 | 10 | 2.0 | — | 480 | 28000 | 1.8 | 75 |
| 3-6 | Aluminum hydroxide | 8.0 | 15 | 1.5 | — | 510 | 28000 | 2.2 | 73 |
| 3-7 | Calcium hydroxide | 1.0 | 5 | 4.0 | — | 480 | 30000 | 1.7 | 76 |
| 3-8 | Aluminum oxide monohydrate | 2.0 | 15 | 1.5 | — | 500 | 30000 | 2.5 | 74 |
| 3-9 | Magnesium oxide | 2.0 | 15 | 4.0 | — | 530 | 30000 | 2.1 | 75 |
| 3-10 | Calcium oxide | 2.0 | 30 | 3.6 | — | 540 | 28600 | 2.4 | 72 |
| 3-11 | Zinc oxide | 2.0 | 10 | 2.5 | — | 610 | 30000 | 3.3 | 74 |
| 3-12 | Beryllium oxide | 8.0 | 20 | 1.2 | — | 540 | 28000 | 2.9 | 72 |
| 3-13 | Aluminum oxide | 4.0 | 15 | 1.8 | — | 590 | 29000 | 3.0 | 74 |
| 3-14 | Strontium oxide | 1.0 | 10 | 2.5 | — | 590 | 31000 | 2.8 | 76 |
| 3-15 | Barium oxide | 3.0 | 20 | 1.2 | — | 580 | 29000 | 2.9 | 76 |
| 3-16 | Cadmium oxide | 1.5 | 15 | 2.5 | — | 590 | 30000 | 2.7 | 75 |

Table 4

| Run No. | Reactive inorganic filler | | Properties of composite composition | |
|---|---|---|---|---|
| | Unsaturated carboxylic acid | Reaction temperature (°C.) | Flexural strength (Kg./cm².) | Izod impact strength (Kg.-cm./cm. notched) |
| 1 | Methacrylic acid | 110 | 850 | 4.9 |
| 2 | Crotonic acid | 110 | 840 | 4.0 |
| 3 | Sorbic acid[1] | 130 | 850 | 4.5 |
| 4 | Maleic acid[1] | 130 | 830 | 4.0 |
| 5 | Vinylacetic acid | 110 | 810 | 4.1 |
| 6 | Styrylacrylic acid[1] | 130 | 810 | 4.1 |
| 7 | Alpha-ethyl acrylic acid | 120 | 830 | 4.2 |
| 8 | Angelic acid | 130 | 840 | 4.2 |
| 9 | Alpha-chloro acrylic acid | 80 | 810 | 4.0 |
| 10 | Vinyl glycolic acid | 80 | 800 | 4.3 |
| 11 | Itaconic acid | 80 | 830 | 4.4 |
| Reference | | | | |
| 4-1 | Propionic acid | 110 | 690 | 3.2 |
| 4-2 | Stearic acid[2] | 150 | 650 | 2.8 |

Table 4-continued

| | Reactive inorganic filler | | Properties of composite composition | |
|---|---|---|---|---|
| Run No. | Unsaturated carboxylic acid | Reaction temperature (°C.) | Flexural strength (Kg./cm².) | Izod impact strength (Kg.-cm./cm. notched) |
| 4-3 | Linoleic acid[2] | 150 | 680 | 3.0 |

Note:
[1] Used as a 60 % ethyl ether solution
[2] Used in the form of powder

Table 5

| | | Properties of composite composition | | | |
|---|---|---|---|---|---|
| Run No. | Acrylic acid per 100g. of calcium carbonate (g.) | Flexural strength (Kg./cm².) | Flexural modulus (Kg./cm².) | Izod impact strength (Kg.-cm./cm. notched) | Heat distortion temperature (264 p.s.i., °C.) |
| 1 | 1 | 620 | 31000 | 3.9 | 75 |
| 2 | 4 | 870 | 29800 | 5.4 | 77 |
| 3 | 8 | 880 | 29100 | 5.6 | 78 |
| 4 | 16 | 600 | 28700 | 3.5 | 75 |
| Reference 1-1 | 0 | 540 | 30500 | 2.2 | 74 |

Table 6

| | Components (parts) | | | | Properties of composite composition | | | |
|---|---|---|---|---|---|---|---|---|
| Run No. | Poly-ethylene | Inorganic filler | Polyhexa-methylene adipamide | Glass fiber | Flexural strength (Kg./cm².) | Flexural modulus (Kg./cm².) | Izod impact strength (Kg.-cm./cm notched) | Heat distortion temperature (264 p.s.i., °C.) |
| 1 | 20 | 47 | 22 | 11 | 860 | 53000 | 5.6 | 114 |
| 2 | 15 | 35 | 33 | 17 | 1200 | 62500 | 7.7 | 172 |
| 3 | 10 | 23 | 45 | 22 | 1600 | 71000 | 7.9 | 208 |

Table 7

| | Components of Composition (parts) | | | Properties of composite composition | | | |
|---|---|---|---|---|---|---|---|
| Run No. | Poly-ethylene | Inorganic filler | Polycapro-lactam | Flexural strength (Kg./cm².) | Flexural modulus (Kg./cm².) | Izod impact strength (Kg.-cm./cm. notched) | Heat distortion temperature (264 p.s.i., °C.) |
| 1 | 15 | 35 | 50 | 810 | 27600 | 5.6 | 72 |
| Reference 7-1 | 15 | 35 | 50 | 492 | 27200 | 2.9 | 69 |
| 7-2 | 50 | — | 50 | 540 | 16000 | 8.0 | 54 |
| 7-3* | — | — | 100 | 941 | 18400 | 2.1 | 57 |

*Example 7 was repeated without using the polyethylene composition.

Table 8

| | Composition | | | Properties of composite composition | | | |
|---|---|---|---|---|---|---|---|
| Run No. | Polyolefin | Melt-mixing temperature of polyolefin and inorganic filler (°C.) | Melt-mixing temperature of polyolefin composition and polyhexamethylene adipamide (°C.) | Flexural strength (Kg./cm².) | Flexural modulus (Kg./cm².) | Izod impact strength (Kg.-cm./cm. notched) | Heat distortion temperature (264 p.s.i. °C.) |
| 1 | Low density polyethylene 1) | 210 | 280 | 490 | 20000 | 8.6 | 68 |
| 2 | Polypropylene 2) | 230 | 280 | 960 | 36200 | 5.1 | 92 |
| 3 | Ethylene-propylene block copolymer 3) | 230 | 280 | 950 | 35800 | 5.4 | 91 |
| Reference 8-1 | Low density polyethylene 1) | — | 280 | 430 | 17200 | 9.9 | 57 |
| 8-2 | Polypropylene 2) | — | 280 | 695 | 20500 | 4.0 | 69 |
| 8-3 | Ethylene-propylene block copolymer 3) | — | 280 | 680 | 20000 | 4.1 | 68 |

Note:
1) Low density polyethylene having a melt index (MI) of 1.6 and a density of 0.92
2) Crystalline polypropylene having a melt flow index (MFI) of 7.8 and a density of 0.91
3) Crystalline ethylene-propylene copolymer containing 20 percent by weight of ethylene and having a MFI of 2.0

Table 9

| Run No. | Ratio of components (parts) Polyoxy-methylene | Polyethylene composition Kind | Polyethylene composition Amount | Properties of composite composition Flexural strength (Kg./cm².) | Flexural modulus (Kg./cm².) | Heat distortion temperature (264 p.s.i., °C.) | PV limit (Kg./cm².cm./sec.) |
|---|---|---|---|---|---|---|---|
| 1 | 90 | I | 10 | 980 | 30100 | 117 | 1270 |
| 2 | 70 | I | 30 | 870 | 32100 | 102 | 1350 |
| 3 | 50 | I | 50 | 700 | 32800 | 88 | 1100 |
| 4 | 90 | II | 10 | 960 | 29200 | 107 | 1220 |
| 5 | 70 | II | 30 | 780 | 27800 | 96 | 1380 |
| 6 | 50 | II | 50 | 650 | 28300 | 83 | 1100 |
| Reference | | | | | | | |
| 9-1 | 100 | — | — | 996 | 28200 | 117 | 700 |
| 9-2 | 90 | III | 10 | 880 | 26200 | 92 | 830 |
| 9-3 | 70 | III | 30 | 620 | 22500 | 79 | 820 |
| 9-4 | 50 | III | 50 | 460 | 16600 | 73 | 710 |

Table 10

| Run No. | Inorganic filler Kind | Number average (μ.) | Maximum (μ.) | BET specific surface area (m²./g.) | Acrylic acid per 100g. of inorganic filler (g.) | Properties of composite composition Flexural strength (Kg./cm².) | Weight loss (%) |
|---|---|---|---|---|---|---|---|
| 1 | Ground calcium carbonate | 1.2 | 10 | 3.0 | 1.0 | 870 | 0.51 |
| 2 | Basic magnesium carbonate | 0.4 | 1 | 6.3 | 2.1 | 890 | 0.83 |
| 3 | Aluminum hydroxide | 8.0 | 15 | 1.5 | 0.5 | 850 | 0.69 |
| 4 | Calcium oxide | 1.0 | 5 | 3.6 | 1.2 | 840 | 0.92 |
| Reference | | | | | | | |
| 10-1 | Ground calcium carbonate | 1.2 | | 3.0 | — | 650 | 13.7 |
| 10-2 | Basic magnesium carbonate | 0.4 | 1 | 6.3 | — | 590 | 17.5 |
| 10-3 | Aluminum hydroxide | 8.0 | 15 | 1.5 | — | 560 | 13.3 |
| 10-4 | Calcium oxide | 1.0 | 5 | 3.6 | — | 530 | 21.8 |

Table 11

| Run No. | Properties of composite composition Flexural strength (Kg./cm².) | Flexural modulus (Kg./cm².) | Heat distortion temperature (264 p.s.i., °C.) | PV limit (Kg./cm².cm./sec.) | Weight loss (%) |
|---|---|---|---|---|---|
| 1 | 870 | 32100 | 102 | 1350 | 0.51 |
| Reference | | | | | |
| 11-1 | 660 | 34800 | 101 | 1050 | 25.0 |

Table 12

| Run No. | Ratio of components (parts) Polyoxy-methylene | Polypropylene composition | Properties of composite composition Flexural strength (Kg./cm².) | Flexural modulus (Kg./cm².) | Heat distortion temperature (264 p.s.i., °C.) | PV limit (Kg./cm².cm./sec.) |
|---|---|---|---|---|---|---|
| 1 | 90 | 10 | 985 | 30900 | 118 | 1300 |
| 2 | 70 | 30 | 891 | 33200 | 110 | 1450 |
| 3 | 50 | 50 | 720 | 33700 | 97 | 1170 |
| Reference | | | | | | |
| 13-1 | 100 | — | 996 | 28200 | 117 | 700 |
| 13-2 | 70 | 30* | 633 | 23600 | 89 | 820 |

*The same polypropylene alone as in Example 13.

Table 13

| Run No. | Ratio of components (parts) Polyethylene terephthalate | Polyethylene composition | Properties of composite composition Flexural strength (Kg./cm².) | Flexural modulus (Kg./cm².) | PV limit (Kg./cm². cm./sec.) |
|---|---|---|---|---|---|
| 1 | 90 | 10 | 904 | 28200 | 620 |
| 2 | 70 | 30 | 813 | 30100 | 650 |
| 3 | 50 | 50 | 665 | 30500 | 580 |
| Reference | | | | | |
| 14-1 | 100 | — | 927 | 25700 | 380 |
| 14-2 | 70 | 30* | 670 | 23600 | 490 |

*The same polyethylene alone as in Example 9.

Table 14

| Run No. | Ratio of components (parts) | | Properties of composite composition | | | |
|---|---|---|---|---|---|---|
| | Polycarbonate | Polyethylene composition | Flexural strength (Kg./cm².) | Flexural modulus (Kg./cm².) | Heat distortion temperature (264 p.s.i., °C.) | Pressure of injection molding (index) |
| 1 | 90 | 10 | 900 | 25600 | 126 | 80 |
| 2 | 70 | 30 | 820 | 28200 | 108 | 72 |
| 3 | 50 | 50 | 750 | 30700 | 97 | 65 |
| Reference | | | | | | |
| 15-1 | 100 | — | 980 | 21500 | 140 | 100 |
| 15-2 | 70 | 30* | 610 | 17900 | 95 | 70 |

*The same polyethylene alone as in Example 9.

Table 15

| Run No. | Ratio of components (parts) | | Properties of composite composition | | | |
|---|---|---|---|---|---|---|
| | Polyphenylene oxide | Polyethylene composition | Flexural strength (Kg./cm².) | Flexural modulus (Kg./cm².) | Heat distortion temperature (264 p.s.i., °C.) | Environmental stress cracking resistance (minute) |
| 1 | 95 | 5 | 990 | 26100 | 195 | >500** |
| 2 | 90 | 10 | 920 | 27700 | 192 | >500** |
| 3 | 80 | 20 | 810 | 28900 | 181 | 6 |
| Reference | | | | | | |
| 16-1 | 100 | — | 990 | 25500 | 196 | 2 |
| 16-2 | 90 | 10* | 730 | 23200 | 186 | 6 |

*The same polyethylene alone as in Example 9.
**No occurrence of cracks

Table 16

| Run No. | Ratio of components (parts) | | Properties of composite composition | | | |
|---|---|---|---|---|---|---|
| | Polyvinyl-chloride | Polyethylene composition | Tensile strength (Kg./cm².) | Tensile elongation (%) | Izod impact strength (Kg.-cm./cm. notched) | Heat distortion temperature (264 p.s.i., °C.) |
| 1 | 100 | 10 | 520 | 13 | 6.2 | 57 |
| 2 | 100 | 30 | 500 | 17 | 7.8 | 55 |
| 3 | 100 | 50 | 470 | 25 | 12.0 | 53 |
| Reference | | | | | | |
| 17-1 | 100 | — | 530 | 11 | 4.0 | 65 |
| 17-2 | 100 | 50* | 390 | 35 | 9.0 | 48 |

*The same polyethylene alone as in Example 9.

What is claimed is:

1. A thermoplastic composite composition comprising
   I. about 95 to about 30 percent by weight of a thermoplastic material selected from the group consisting of polyamide, polyester, polyacetal, polycarbonate, polyphenylene oxide, polyvinylchloride and polystyrene, and
   II. about 5 to about 70 percent by weight of a polyolefin composition comprising
      A. about 15 to about 60 percent by weight of a polyolefin and
      B. about 85 to about 40 percent by weight of at least one reactive inorganic filler,
   said reactive inorganic filler having been prepared by effecting reaction between
      a. an inorganic material substantially comprising at least one compound selected from the group consisting of metal carbonates, metal hydroxides and metal oxides, said metal being selected from the group consisting of beryllium, magnesium, calcium, strontium, barium, zinc, cadmium and aluminum, said compound having a number average particle diameter of from about $0.01\mu$ to about $50\mu$ and a maximum particle diameter of about $100\mu$, and
      b. at least one unsaturated aliphatic or aromatic carboxylic acid having from 3 to 11 carbon atoms, one or two ethylenic unsaturations, one or two carboxyl groups, the proportion of said unsaturated aliphatic or aromatic carboxylic acid being from about 0.05 to 20 percent by weight of the total weight of said inorganic material,
   with stirring and removal of the evolved water in the powder state of said inorganic material at a temperature up to the temperature at which said aliphatic or aromatic carboxylic acid begins to decompose.

2. The composite composition of claim 1 wherein the amount of said thermoplastic material is from about 90 to about 50 weight percent and the amount of said polyolefin composition is from about 10 to about 50 weight percent.

3. The composition of claim 1 wherein said thermoplastic polyamide is polyhexamethylene adipamide.

4. The composite composition of claim 1 wherein said thermoplastic is polycaprolactam.

5. The composite composition of claim 1 wherein said thermoplastic material is polyoxymethylene homopolymer.

6. The composite composition of claim 1 wherein said thermoplastic material is polyethylene terephthalate.

7. The composite composition of claim 1 wherein said thermoplastic material is poly (2,6-dimethyl-1,4-phenylene) oxide.

8. The composite composition of claim 1 wherein said thermoplastic material is polyvinyl chloride.

9. The composite composition of claim 1 wherein said thermoplastic material is the polycarbamate of 2,2-bis(4-hydroxyphenyl) propane.

10. The composite composition of claim 1 wherein said polyolefin composition comprises from about 25 to about 50 percent by weight of a polyolefin and from about 75 to about 50 percent by weight of at least one reactive inorganic filler.

11. The composite composition of claim 1 wherein said inorganic material is selected from the group consisting of calcium carbonate, magnesium carbonate, strontium carbonate, barium carbonate, beryllium oxide, magnesium oxide, calcium oxide, strontium oxide, barium oxide, zinc oxide, cadmium oxide, aluminum oxide, aluminum oxide hydrate, magnesium hydroxide, calcium hydroxide and aluminum hydroxide.

12. The composite composition of claim 1 wherein said inorganic material is calcium carbonate.

13. The composite composition of claim 1 wherein said inorganic material is magnesium hydroxide.

14. The composite composition of claim 1 wherein said aliphatic or aromatic carboxylic acid is selected from the group consisting of acrylic acid, methacrylic acid, alpha-ethylacrylic acid, alpha-chloroacrylic acid, crotonic acid, sorbic acid, maleic acid, itaconic acid, vinylacetic acid, vinylglycolic acid, angelic acid and styrylacrylic acid.

15. The composite composition of claim 1 wherein said carboxylic acid is acrylic acid.

16. The composite composition of claim 1 wherein said polyolefin is selected from the group consisting of polyethylene, polypropylene and ethylene-propylene copolymer.

17. The composite composition of claim 1 wherein said thermoplastic material is polystyrene.

* * * * *